(12) United States Patent
Roles, Jr.

(10) Patent No.: US 7,516,747 B2
(45) Date of Patent: *Apr. 14, 2009

(54) ASSEMBLY AND SYSTEM FOR ISOLATION OF WASTE WATER IN OUTDOOR, OPEN-AIR WASH STATION

(76) Inventor: Joseph W. Roles, Jr., 1060 NW. 70th Way, Plantation, FL (US) 33313

( * ) Notice: Subject to any disclaimer, the term of this patent is extended or adjusted under 35 U.S.C. 154(b) by 0 days.

This patent is subject to a terminal disclaimer.

(21) Appl. No.: 11/859,362

(22) Filed: Sep. 21, 2007

(65) Prior Publication Data

US 2008/0053492 A1 Mar. 6, 2008

Related U.S. Application Data

(63) Continuation of application No. 10/714,340, filed on Nov. 14, 2003, now Pat. No. 7,278,435.

(51) Int. Cl.
*B08B 3/02* (2006.01)
(52) U.S. Cl. ...................... 134/123; 134/186
(58) Field of Classification Search ................ 134/123, 134/186
See application file for complete search history.

(56) References Cited

U.S. PATENT DOCUMENTS

| | | | | | |
|---|---|---|---|---|---|
| 3,236,248 | A | * | 2/1966 | Ray | 134/58 R |
| 3,409,218 | A | * | 11/1968 | Moyer | 237/12.3 B |
| 4,882,792 | A | * | 11/1989 | Vincent | 4/323 |
| 4,905,325 | A | * | 3/1990 | Colditz | 4/321 |
| 4,979,529 | A | * | 12/1990 | Fox | 137/87.03 |
| 5,597,001 | A | * | 1/1997 | Rasmussen et al. | 134/104.2 |
| 6,021,792 | A | * | 2/2000 | Petter et al. | 134/111 |
| 6,655,396 | B2 | * | 12/2003 | Krenzel | 134/104.1 |

\* cited by examiner

*Primary Examiner*—Frankie L Stinson
(74) *Attorney, Agent, or Firm*—Steven M. Greenberg, Esq.; Carey, Rodriguez, Greenberg & Paul LLP

(57) ABSTRACT

A system and method for the collection of waste water generated in the course of maintenance or washing of a large object in an open-air, outdoor environment. The system, in its simplest form, includes a wash deck having a drain located within a valley of the deck, an interceptor drain for separation of particulates and sludge from the wash fluid, an actuator, that is responsive to changes in hydraulic pressure of wash water supply, for opening and closing a waste stream control valve and a waste steam control valve intermediate between the interceptor drain and a sanitary sewer connection. The system of this invention operates independent of elaborate controls and any external power source. Thus, it can be used in relatively remote locations and/or installed in areas where electricity is unavailable, or the presence of electrical current would be incompatible with safety of livestock or thoroughbred race horse.

1 Claim, 3 Drawing Sheets

ELEVATION

ASSEMBLY AND SYSTEM FOR ISOLATION OF WASTE WATER IN OUTDOOR, OPEN-AIR WASH STATION

BACKGROUND OF THE INVENTION

1. Field of the Invention

This invention relates to an assembly and to a system. More specifically, this invention is directed to an assembly for washing large objects; and, to a system for the isolation/ collection of waste water (also herein "gray water") resulting from such washing activities, and, means for directing the discharge thereof into a waste water treatment facility of a municipal sewer treatment system or other suitable waste water containment system for subsequent treatment off-site. The system and assembly of this invention relies upon energy recovery from hydraulic pressure within the system to open and close the valves employed therein, so as to function without a controller or a separate power source. Notwithstanding that this assembly and system are designed for use in an open air, outdoor environment, the system can remain unattended when not in use, and yet prevents rain water from collecting within the drain of the assembly and discharging into the sanitary sewer connection of the waste water treatment facility. This assembly and system is particularly useful for washing transportation conveyance (e.g. aircraft, ships, buses, trains, etc.) and large animals (e.g. thoroughbred racehorses).

2. Background of Invention

The need to periodically wash larger objects, generally involves the use of an outdoor open-air wash station wherein the wash and rinse fluids have traditionally been discharged into the ground or into a storm drain. Because of the environmental impact of discharge of wash and rinse fluids into the ground or storm drains, governmental regulation (Federal, State & Municipal) have and continue to restrict such activities or mandate rules to control such activities. Presently, stringent controls have been put in place to contain discharges from car washes, and gray water discharges resulting from boat and aircraft maintenance. Similarly, governmental controls also impose strict regulation on commercial operations (veterinary clinics, horse race tracks, etc.) involved in the grooming of animals, (e.g. thoroughbred race horses), particularly were waste water produced from such grooming activities can contain cosmetic agents and natural waste products.

Where, for example, a wash/maintenance station is located in an open-air outdoor environment, the simple provision of fluid collection drain, connected to the storm sewer, has been an unacceptable option or solution because the discharge of gray water associated with such operations is (a) generally contaminated with potentially harmful materials (e.g. petroleum products, solids, chemicals, biocides, etc.), and (b) rain water also collects within the same drain and is also discharged into the sanitary sewer system, thereby overloading the system's water treatment capacity.

In order to prevent ground water contamination and/or pollution of rivers and streams, the regulations pertaining to such activities require that the discharge from such washing and/or grooming activities be contained for later treatment off-site, or discharged directly into a municipal waste water treatment facility through a sanitary sewer connection. Because such municipal waste water treatment facilities have a limited or finite treatment capacity, the discharge from such commercial operations is often pre-treated for recovery of recyclable components or concentrated to reduce its volume. These same regulations also dictate that rain water be handled through a separate storm drain/sewer so as avoid overburdening municipal waste water treatment facilities.

Because of the foregoing restrictions and limitations relative to gray water collection and treatment, and the further requirement, in an outdoor open-air environment, to isolate of such gray water collection from inadvertent dilution or mixing with rain water, the washing of large objects in commercial environments has been severely constrained and expensive. More specifically, aircraft or boat maintenance facilities typically perform such maintenance operations, including cleaning, so as to recover gray water in a separate containment vessel and, thereafter, have such waste processed off-site in a licensed disposal facility.

The prior efforts at design of wash stations for use in conjunction with larger objects have, thus, far been either marginally acceptable, or are otherwise obsolete because of the increased regulation imposed by governmental agencies charged with responsibility for maintenance of water quality and containment of potentially hazardous industrial wastes. A number of these systems have been disclosed in the patent and technical literature. The following patent are representative of the types of waste containment system used in the maintenance of larger objects.

U.S. Pat. No. 5,398,632 (to Goldbach et al., issued Mar. 21, 1995) discloses a dry-dock mountable containment assembly for the cleaning and refurbishing of ships and large watercraft. In the Goldbach et al., system, the ship is placed in a dry-dock equipped with his containment system and all operations, pressure cleaning, sand blasting etc., performed within the controlled environment provided by his containment system. Thus, any waste fluids, paint residues, chemicals and toxic metals used in bottom coatings are contained within this environment for disposal of off-site.

The same type of containment system is becoming increasingly prevalent in boat yards that are located on bodies of water; or, alternatively, operations involve the routine pressure cleaning of boats. In a number of locations, the pressure cleaning of boats is prohibited altogether.

U.S. Pat. No. 5,063,880 (to Bouthillier, issued Nov. 12, 1991) discloses an automatic wash station of the type used to clean animals in an agricultural environment. The Bouthillier automatic wash station is comprised of a framework defining a portal through which farm animals are directed one-by-one. An electronic detection device is associated with the portal and connected to a control circuit to provide a detection signal thereto when a farm animal enters the portal. Spray nozzles are oriented with respect to the animals position within such portal to spray animals passing through the portal. A pump is provided to supply a chemically treated liquid to the spray nozzles under pressure. The pump is actuated by the control circuit upon sensing of the detection signal. One or more valves are connected to the spray nozzles; and, a liquid reservoir, containing the chemically treated liquid, is connected to the pump. A pump deactivation circuit including a timing circuit is provided to deactivate the pump after a predetermined time lapse from reception of a valve closing signal. When the valve is closed, the spray nozzles shut down. Bouthillier does not appear to be concerned with disposal of wash fluids and no means for containment or recycling are disclosed.

Similar animal wash and treatment stations are disclosed in U.S. Pat. No. 6,029,610 (to Ramsey et al); U.S. Pat. No. 5,630,379 (to Gerk et al); and, U.S. Pat. No. 4,836,133 (to Cole). In the contrivance described in each of Ramsey et al, Gerk et al and Cole, a relatively small animal is treated with a medicant dissolved within a fluid, and the animal contacted with the fluid by immersion, spaying or combination thereof. This treatment of the animal is performed within a controlled environment and, thus, potentially toxic materials appear to have been effectively contained.

As is evident from the foregoing discussion of the prior art systems, there has been, and continues to, be increasing public sentiment and sensitivity to the disposal of wastes generated in commercial environments, such as in the maintenance of ships, aircraft, and in the grooming/treatment of larger animals. The containment and recovery of wastes in wash fluids in such commercial environments for processing off-site is both time consuming and inordinately expensive, particularly where the waste fluid can be effectively neutralized in existing municipal sewage treatment facilities. The use of municipal sewage treatment for such purposes has, however, been circumscribe because it has not been feasible to collect such waste water in an open-air environment without also exposing such collection efforts to rain water intrusion. Thus, where a drain within a wash basin or treatment race would ordinarily suffice for this purpose, such simple expedient would be impractical if used out of doors.

Accordingly, there continues to exist a need to provide a simple yet effective means for the selective collection of waste fluids generated within a commercial environment. In order to be effective the means selected should be readily adaptable for discharge of the waste fluid directly into a sanitary sewer pipe for treatment within a municipal waste water treatment facility. Ideally this system should also be compatible for use in an open-air, outdoor environment without intrusion or dilution of the waste stream by rain water.

OBJECTS OF THE INVENTION

It is the object of this invention to remedy the above as well as related deficiencies in the prior art.

More specifically, it is the principle object of this invention to provide an assembly and system for washing a large object in an open-air, outdoor environment that is compatible with both recovery of gray water resulting from such washing operation, and yet isolation of the recovered gray water discharge from rain water intrusion.

It is another object of this invention to provide an assembly and system for washing a large object in an open-air outdoor environment, wherein hydraulic pressure from a wash fluid is used to control both the collection and discharge of gray water from the wash station into a sanitary sewer connection, and the isolation of such discharge from rain water intrusion.

It is yet another object of this invention to provide an assembly and system for washing a large object in an open-air outdoor environment, wherein the gray water from the washing operation is subjected to pre-screening through an interceptor drain for removal of sediment and sludge before discharge into a sanitary sewer connection.

Additional objects of this invention a method for collection and processing of gray water discharge from an open-air outdoor wash station before it is discharge into a sanitary sewer connection.

SUMMARY OF THE INVENTION

The above and related objects are achieved by providing a system and method for the collection of waste water generated in the course of maintenance or washing of a large object in an open-air, outdoor environment. The system, in its simplest form, comprises wash deck having a drain located within a valley of the deck; means associated with the drain for separation of particulates and sludge from the wash fluid; an actuator, that is responsive to changes in hydraulic pressure in said wash fluid, for opening and closing a waste stream control valve; and, a waste steam control valve intermediate between the drain and a sanitary sewer connection. When the actuator senses an increase in hydraulic pressure from the wash fluid, upon the onset of the washing operation, the waste stream control valve is opened, thereby permitting waste water to flow from the deck into the sanitary sewer connection. Conversely, when the actuator senses a decrease in hydraulic pressure upon the conclusion of the washing operation, the waste stream control valve is closed. Thus, any fluids that thereafter collect on the surface of the wash deck are precluded from flowing into the sanitary sewer connection. In the preferred embodiments of this invention, the waste stream control valve is mechanical bias in the closed position, and stores energy within a biasing means associated therewith, to return the valve to its normal closed position upon the completion of the wash cycle.

The cyclic opening and closing of the waste stream control valve with the corresponding wash cycle, effectively isolates the sanitary sewer connection from the drain in the wash deck, when the wash deck is not in use, and, thus, prevents rain water intrusion into the sanitary sewer.

DESCRIPTION OF THE INVENTION
INCLUDING PREFERRED EMBODIMENTS

The Figures which accompany this application, and referenced herein, depict a representative system and assembly of his invention. In the embodiments of this invention illustrated in these Figures, the components of the assembly have been isolated from one another, where practical, to depict their individual features and interactions with one another.

Figure 1:
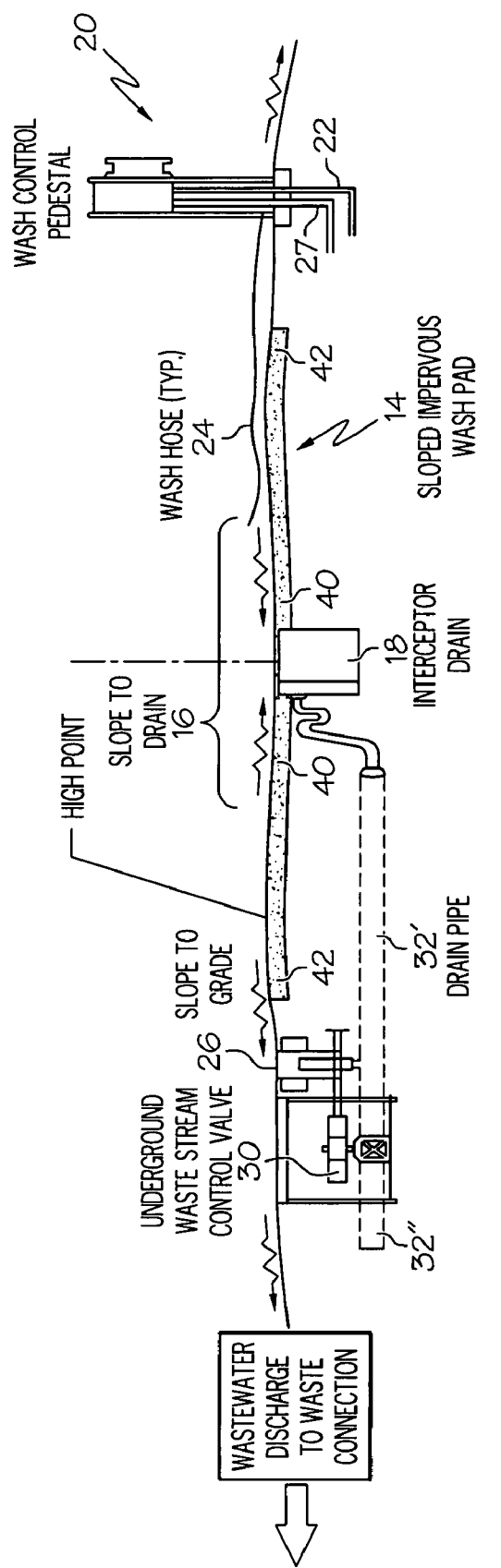
FIG. 1 is an diagrammatic view of the wash station assembly of this invention.

FIG. 1 depicts in diagrammatic fashion, a wash station assembly of this invention. In brief, the wash station (10) consists of a wash deck (12) comprising a fluid impervious wash pad (14) having a compound slope, wherein a radial area (16) proximate to the drain (18) defines a bowl (20) leading to said drain (18), and the remaining area of the deck, that is peripheral to such bowl, slopes away from the drain and thereby directs fluids off the surface of deck. The drain (18) is preferably centrally located on the wash deck (12), however, its relative position is a matter of design as opposed to operation. The deck drain (18) includes a surface grating (18') that is flush with the deck surface and is preferable integral with an interceptor drain (18) located below the deck surface, which is designed for separation of sediment and sludge that may be present in the waste water fluids that are collected from the deck surface and flow into this interceptor drain.

In the depiction of the invention illustrated in FIG. 1, the wash station (10) includes a wash control pedestal (20) that is connected to a pressurized water source or supply of wash water (22) and to a hose (24) or nozzle (24') for delivery of the wash water, under pressure, to an object on the wash deck (14). A pressure regulator (26) is also preferably installed in-line with between the pressurized source of wash supply (22) and the wash water delivery hose (24) or nozzle (24') to modulate the pressure of the wash water from about 10 to 35 psi, and thereby control the volume of wash water used in each wash cycle. The pressure regulator (26) is also designed to inhibit the flow wash water from the wash water source (22) to the wash deck, and thereby creates back pressure within an actuator line (27) in fluid communication therewith. This back pressure is transmitted via the actuator line (27) to an actuator assembly (30) that is mechanically coupled to a waste stream control valve (32) that separates/isolates the waste water resulting from washing operations system of this invention from the sanitary sewer.

In operation of the wash station (10) depicted in FIG. 1, a supply valve (28) associated with the wash water supply line (22) is opened thereby causing water to concurrently flow through a pressure regulator (26) of the pedestal, and into an actuator line (27) to a hydraulic actuator (30) that is mechanically coupled to a waste stream control valve (32). The hydraulic pressure exerted upon this actuator (30) causes the waste stream control valve (32) to open, and thereby creates a fluid pathway, through a conduit (32'), from the interceptor drain (18) to a sanitary sewer connection (32"). Thus, wash (gray) water is permitted to flow from the wash deck (12) through the interceptor drain (18) to the sanitary sewer for neutralization of detergents and chemical residues that may be present in the wash (gray) water.

So long as the wash water pressures are exerted upon the hydraulic actuator, the waste stream control valve remains open, and wash water will continuously flow from the wash deck into the sanitary sewer. Conversely, when the wash water pressure drops below a defined threshold, such as when the source of wash water is turned off, the hydraulic actuator senses such pressure drop, and the waste stream control valve returns to its normally biased closed, thereby preventing any further flow of water from the wash deck through the deck drain and into the sanitary sewer.

Figure 2:
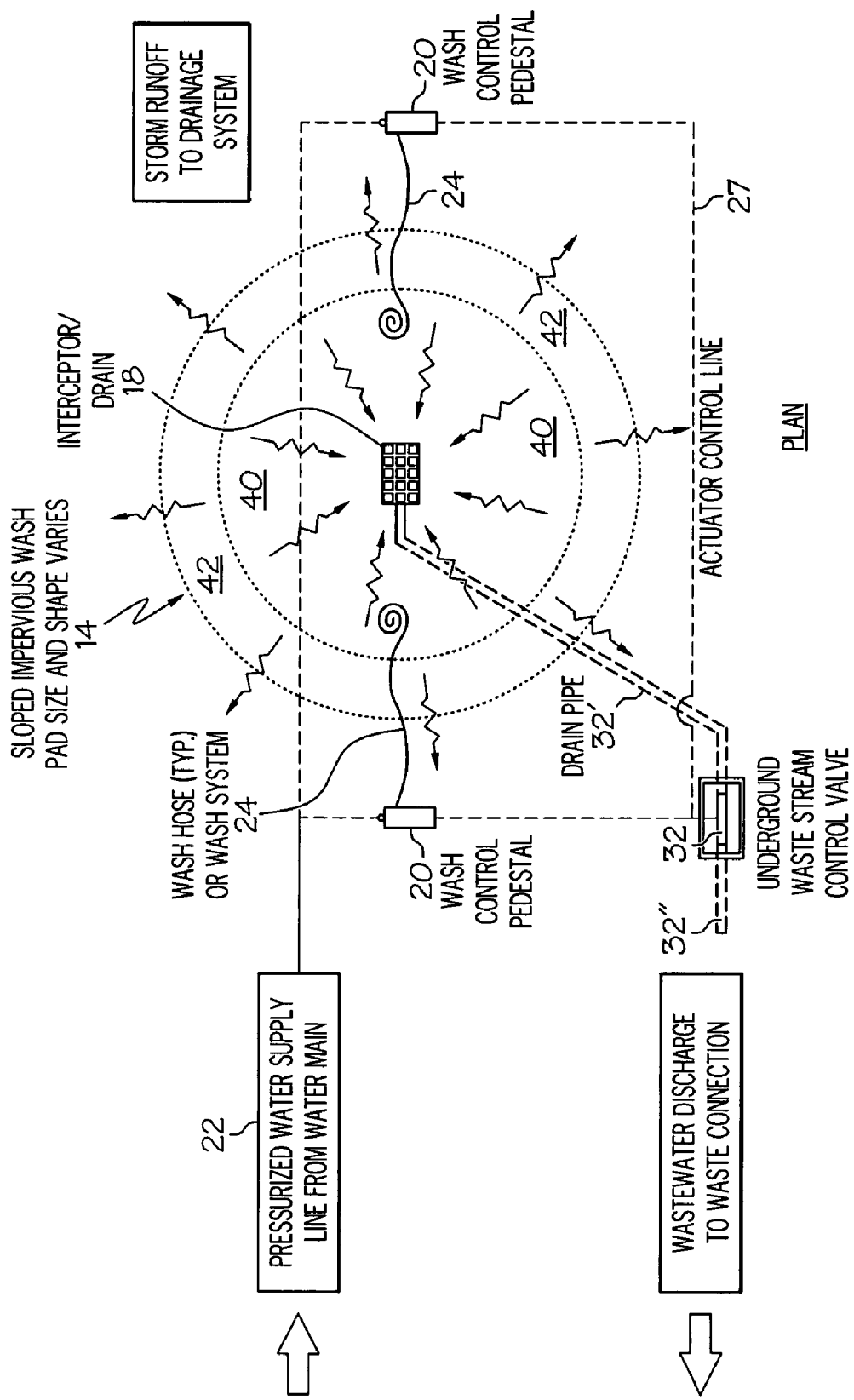
FIG. 2 is a plan view of the wash deck, when viewed from above, of the wash station assembly of FIG. 1.

FIG. 2 depicts a plan view of the interceptor drain (18) of the wash deck (12), including specifically the compound slope of the wash deck. As illustrated therein, the radial area (40) proximate to the deck drain (18) is sloped in the direction indicated by the arrows toward the drain, whereas the remainder of the deck surface (42) to the periphery of radial area (40) is sloped away from the drain, thereby causing fluids in such peripheral areas to drain off the wash deck. Because of the inclination of the conduit from the interceptor drain to the waste stream control valve, the conduit is effective drained of wash fluid at the time this valve is closed. The surface grating (18') of the deck drain (18) of the wash deck does, however, remain open. Thus, when rain falls upon the wash deck, wash residues remaining within the radial area (40) surrounding the drain are flushed by the rain water into the drain and collect within the empty section of conduit between the interceptor drain (18) and the waste steam control valve (32). As the volume of rain water falling up the wash deck exceeds the capacity of the interceptor drain and this section of conduit, it spills over the lip of the bowl that surrounds the deck drain, and flows from the deck surface into the surrounding environment remain essential free of contaminants from the wash deck. Thus, upon the resumption of the next wash cycle, the wash deck residues, that where flushed from the deck by the rain water into the interceptor drain, are directed into the sanitary sewer connection upon the opening of the waste stream control valve.

Figure 3A:
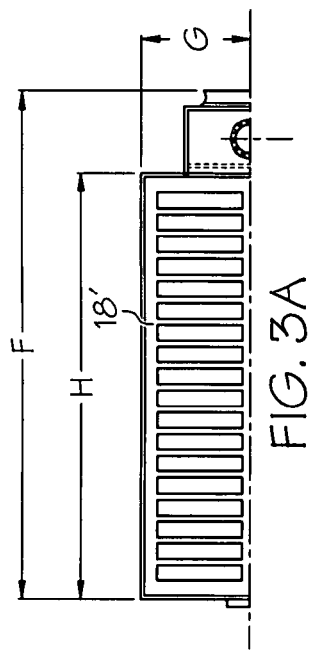
FIG. 3 is a sectional view of an interceptor drain of the wash station assembly of FIGS. 1 & 2.
Figure 3B:
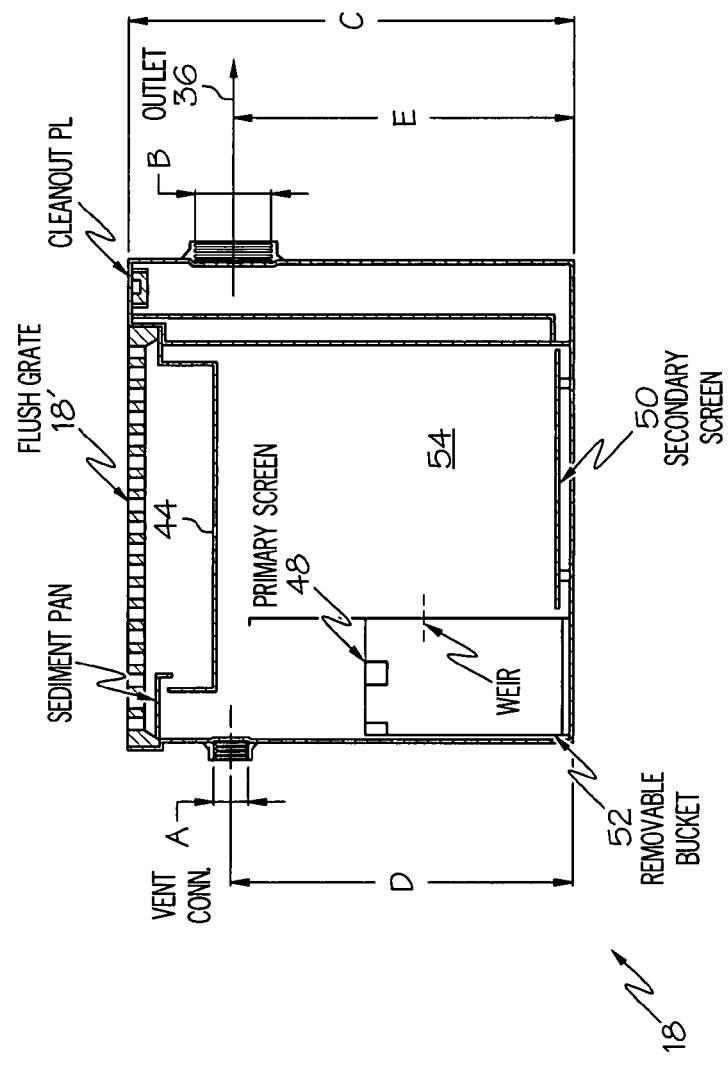

FIG. 3 depicts, in cross-section, an interceptor drain (18) suitable for use in this invention. Interceptor drains suitable for use in this invention can have a variety of proprietary configuration, and the one depicted in FIG. 3 is design for separation of oil and sediment from waste water (Model No. Z-1189, commercially available from Zurn Industries, Ltd., Mississauga, Ontario Province, Canada). This interceptor drain (18) includes a surface grating (18') which covers a sediment pan (44). As waste water collects on the deck, it flows through the surface grating (18') into the interceptor drain (18), and is progressively stripped of particulate matter and sludge. The waste water initially flows into a sediment pan (44) located immediately under the grate (18') where large particle are collected. The waste water thereafter overflows this pan (44) and into a primary (48) and then into a secondary screen (50) within the drain. As described above relative to the sediment pan, particulate matter is trapped within a vessel or bucket (52) associated with the primary screen (48) and within yet another chamber (54) associated with the secondary screen (50). Oil and sludge within the waste water also collects within the chambers located in base of the drain. Relatively sediment and sludge-free waste water is, thus, permitted to flow from the interceptor drain from an outlet (56) located above the level of the screens of the drain into a conduit that is connected to a sanitary sewer connection.

As is evident from the foregoing, the wash deck operates without external power sources and/or a controller, and utilizes the hydraulic (back) pressure created by restriction of water flow by a pressure reduction valve within the wash water supply line, to provide the impetus/force to open the waste stream control valve without any additional electromechanical control or oversight. In the preferred embodiments of this invention, energy is stored within a spring that is displaced upon the opening of this waste stream control valve. Thus, when the hydraulic pressure is reduced or eliminated upon completion of the wash cycle, the energy stored in this spring returns the waste stream control valve to its normally closed position. Accordingly, the system operates independent of elaborate controls and any external power source. Thus it can be used in relatively remote locations and/or installed in areas where electricity is unavailable, or the presence of electrical current would be incompatible with safety of livestock or thoroughbred race horse

What is claimed is:

1. In a open-air outdoor wash station for large objects, such as is used for periodic maintenance of transportation vehicles and washing of large animals, wherein said wash station includes a wash deck, a source of wash fluid and means for channeling said wash fluid from said wash deck, wherein the improvement comprises:
    A. A source of pressurized wash fluid connected through a fluid supply conduit, within a wash station, to a pressure control valve for concurrently (1) reducing pressure of said wash fluid as it flows through said pressure control valve to a wash fluid delivery means within said wash station and (2) increasing pressure within an actuator fine that is in fluid communication with a hydraulic actuator, each of said fluid supply conduit and said actuator line being in fluid communication with each other and separated from said wash fluid delivery means by said pressure control valve; and
    B. A hydraulic actuator mechanically coupled to a waste stream control valve; and
    C. A waste stream control valve, which is mechanically biased in a closed position, mechanically coupled to said hydraulic actuator, whereby an increase in hydraulic pressure in said actuator line causes said actuator to force open said waste stream control valve, and a release of hydraulic pressure within said actuator line removes said opening force from said waste stream control valve, thereby allowing said waste stream control valve to return to a closed position.

* * * * *